United States Patent [19]

Bloomer

[11] 4,292,056
[45] Sep. 29, 1981

[54] ENDLESS PAINT SEPARATING MEMBER FOR PAINT SPRAY BOOTHS

[75] Inventor: Ivan Bloomer, London, England

[73] Assignee: Carrier Drysys Limited, London, England

[21] Appl. No.: 82,187

[22] Filed: Oct. 5, 1979

[30] Foreign Application Priority Data

Oct. 10, 1978 [GB] United Kingdom ............... 39893/78

[51] Int. Cl.³ ..................... B01D 45/08; B01D 45/18; B01D 46/22
[52] U.S. Cl. .......................................... 55/243; 55/353; 55/446; 55/DIG. 46; 98/115 SB; 118/326; 118/DIG. 7
[58] Field of Search ................... 55/96, 243, 351, 353, 55/444, 446, 465, DIG. 46; 98/115 SB; 118/326, DIG. 7

[56] References Cited

U.S. PATENT DOCUMENTS

| 1,794,764 | 3/1931 | Goethel ...................... 98/115 SB X |
| 2,232,561 | 2/1941 | Richards .......................... 55/353 X |
| 2,257,516 | 9/1941 | Roche, Jr. et al. ......... 98/115 SB X |
| 2,765,869 | 10/1956 | Benjamin et al. ..................... 55/243 |
| 3,110,582 | 11/1963 | Simpson ............................. 55/446 |
| 3,252,401 | 5/1966 | Smith .............................. 118/326 X |

FOREIGN PATENT DOCUMENTS

| 2115590 | 7/1972 | France ................................... 55/243 |
| 166677 | 7/1921 | United Kingdom . |
| 846749 | 8/1960 | United Kingdom .................. 55/243 |
| 871355 | 6/1961 | United Kingdom .......... 98/115 SB |
| 1529254 | 10/1978 | United Kingdom . |

*Primary Examiner*—Kathleen J. Prunner
*Attorney, Agent, or Firm*—Krass, Young & Schivley

[57] ABSTRACT

A system for removing paint from the paint-laden air extracted from a paint spray booth includes an endless paint receiving member formed from a plurality of linked channel members. Each channel member has air inlet apertures in the top surface thereof and an elongate plank arranged beneath said apertures such that air flowing through said apertures is diverted by the plank and deposits its paint thereon. The paint receiving member is circumgyrated so that each portion thereof on which paint has been deposited is subsequently moved through a series of washing baths containing solvents to remove the paint and aqueous solutions to rinse off the solvents.

9 Claims, 4 Drawing Figures

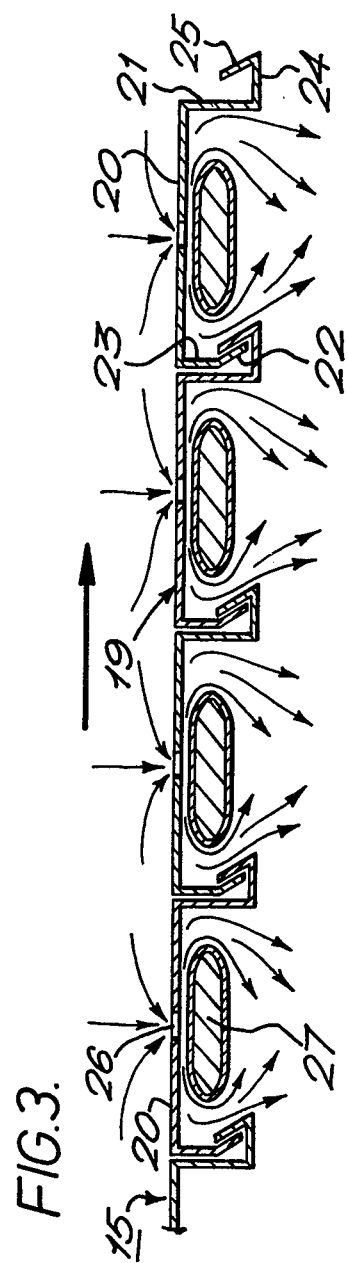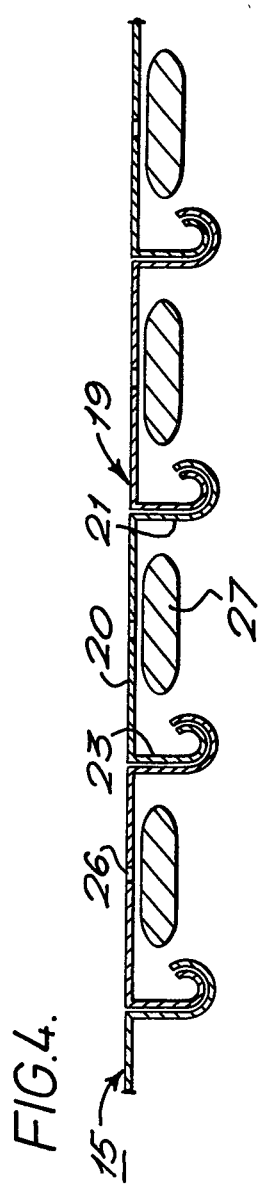

ENDLESS PAINT SEPARATING MEMBER FOR PAINT SPRAY BOOTHS

BACKGROUND OF THE INVENTION

This invention relates to a paint receiving member for removing paint from paint-laden air and to a system and a method for removing paint from the paint-laden air which is extracted from a paint spray booth during a spraying operation.

The removal of unused paint from the air of a paint spray booth customarily involves the use of aqueous solutions to scrub particulate paint from the extracted air, wash any surfaces tending to acquire deposited paint, and convey the waste paint as a dispersion to a central accumulation and disposal reservoir.

There are a number of inherent disadvantages in the use of such scrubbing means for waste paint removal. Thus, such scrubbing means involve the use of large volumes of water which is recirculated, and the power required to run the circulating pumps is significant. Furthermore, the accumulation reservoir contains large volumes of waste paint, water and air and thereby adds to the space requirements of the installation. The reservoir must also be equipped with mechanical means for dredging and scumming the waste paint. In addition, the water used for the scrubbing process humidifies the extracted air so that there is a consequent wastage of water.

Paint extract systems for spray booths employing travelling band filters have been proposed but such filters have not been adopted for large booths. In this respect, if the material of the filter has a structure which is sufficiently intricate to ensure efficient removal of the paint from the air the cost of the filter material makes the cost of filter replacement prohibitive. The intricate nature of the filter material structure and the fact that paint is highly adhesive make it virtually impossible to clean and reuse the filter material.

Furthermore, for applications where the articles to be painted are not suspended above the booth floor the use of a filter introduces an appreciable maintenance burden as the parts of the booth floor which are required to be load bearing cannot be protected by the filter and therefore have to be periodically cleaned.

SUMMARY OF THE INVENTION

It is an object of the present invention to provide a system for the removal of paint from the paint-laden air from a paint spray booth which minimizes the disadvantages of the conventional systems.

According to a first aspect of the present invention a system for removing paint from the paint-laden air extracted from a paint spray booth comprises a paint receiving member and a paint removing zone, said paint receiving member being arranged such that the paint-laden air impinges on at least a portion thereof and deposits its paint thereon and said paint receiving member being movable through said paint removing zone.

Preferably, the paint receiving member is an endless member movable so that portions thereof carrying paint are subsequently moved through said paint removing zone in which the paint is removed from the member. In this way, a paint free portion of the endless member can again be moved into the air flow and so the efficiency of the paint removing operation is not impaired by a build up of paint.

Preferably the endless member comprises a surface including air inlet apertures and a plurality of plates arranged to be impinged on by air flow through said orifices and to divert the air flow so that the paint carried by the air is deposited on said elements.

According to a further aspect of the present invention there is provided a paint receiving member for removing paint from paint-laden air, said paint receiving member comprising a surface including air inlet apertures and at least one plate arranged to be impinged on by air flow through said orifices and to divert the air flow such that paint carried by the air is deposited on said element.

Preferably, the member is endless and a series of plates are provided, each plate being associated with one or more inlet apertures.

Said plates may be supported on a conveyor chain or belt and subsequently moved through a washing bath or a series of such baths in which the deposited paint is removed.

In an embodiment each of said plates is an elongate plank supported downstream, in the direction of air flow, of a substantially planar surface in which one or more air inlet apertures are provided. Preferably, each said surface is provided on a channel member within which a respective elongate plank is supported. If required, the sides of adjacent channel members can be linked together so that the provision of a separate conveyor belt or chain is not required.

The endless member may form the floor of a paint booth or may be supported beneath the grille forming the floor of a conventional spray booth.

In a preferred embodiment the upper run of the endless member is arranged to be impinged on by the air flow and the lower run is received within a washing bath containing solvents and the like.

The present invention also extends to a paint spray booth incorporating a system for removing paint from the paint-laden air thereof as described above.

The invention also extends to a method of removing paint from the paint-laden air extracted from a paint spray booth comprising impinging the paint-laden air on at least a portion of a paint receiving member such that the paint is deposited on said member and subsequently moving said portion of the paint receiving member through a zone in which the paint is removed therefrom.

Preferably, the paint-laden air is arranged to flow through said portion of the paint receiving member such that the direction of the air flow is changed when it impinges on said plates whereby the paint carried by the air flow is deposited.

BRIEF DESCRIPTION OF THE DRAWINGS

Embodiments of the present invention will hereinafter be described, by way of example, with reference to the accompanying drawings in which:

FIG. 3 shows schemmatically a section of a part of the endless member of the system of FIG. 2, and FIG. 4 shows a section similar to FIG. 3 of a further embodiment of the invention.

DESCRIPTION OF THE PREFERRED EMBODIMENTS

Figure 1:
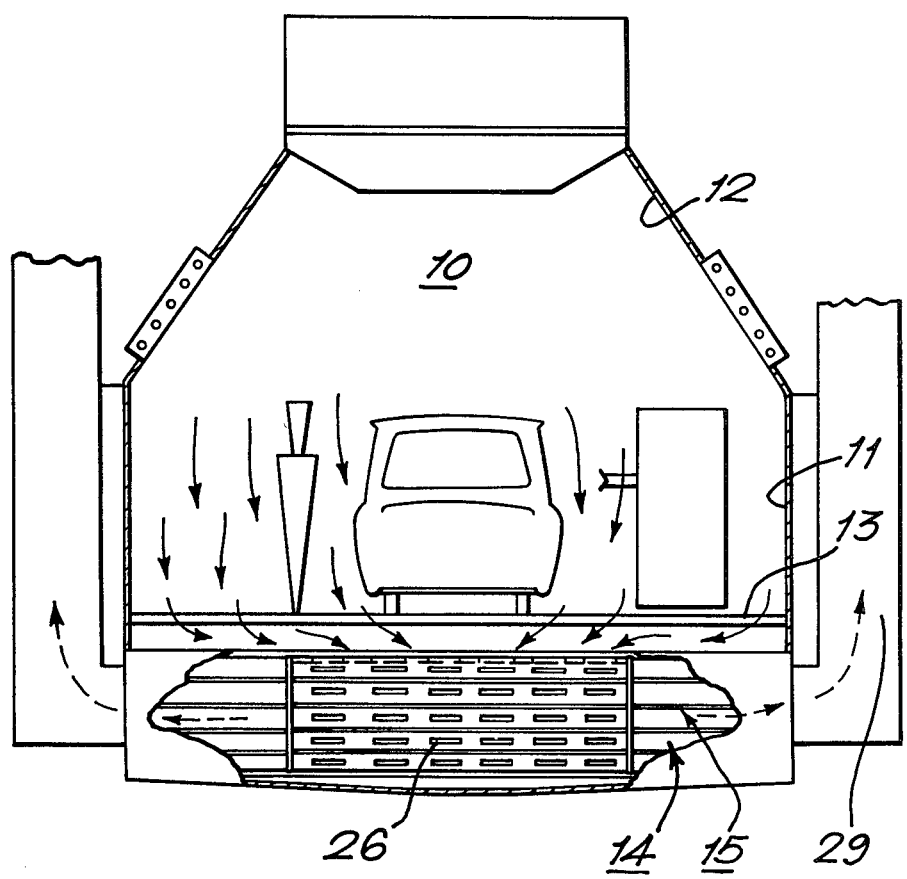
FIG. 1 shows schemmatically an end elevation partly in section of a paint spray booth embodying a system of the present invention.

The present invention is applicable to any paint spray booth used to spray paint onto articles. An end elevation of such a paint spray booth is shown in FIG. 1. The booth comprises a spraying enclosure 10 defined by walls 11, a roof structure 12 and a generally horizontal floor 13. The floor 13 is in the form of a grid or grille and defines the roof of an enclosure 14 positioned beneath the spraying enclosure 10. The paint-laden air from the spraying enclosure 10 is extracted through the openings in the floor 13 and enters the enclosure 14 in which the paint is removed from the air and is deposited on a paint receiving member 15.

Figure 2:
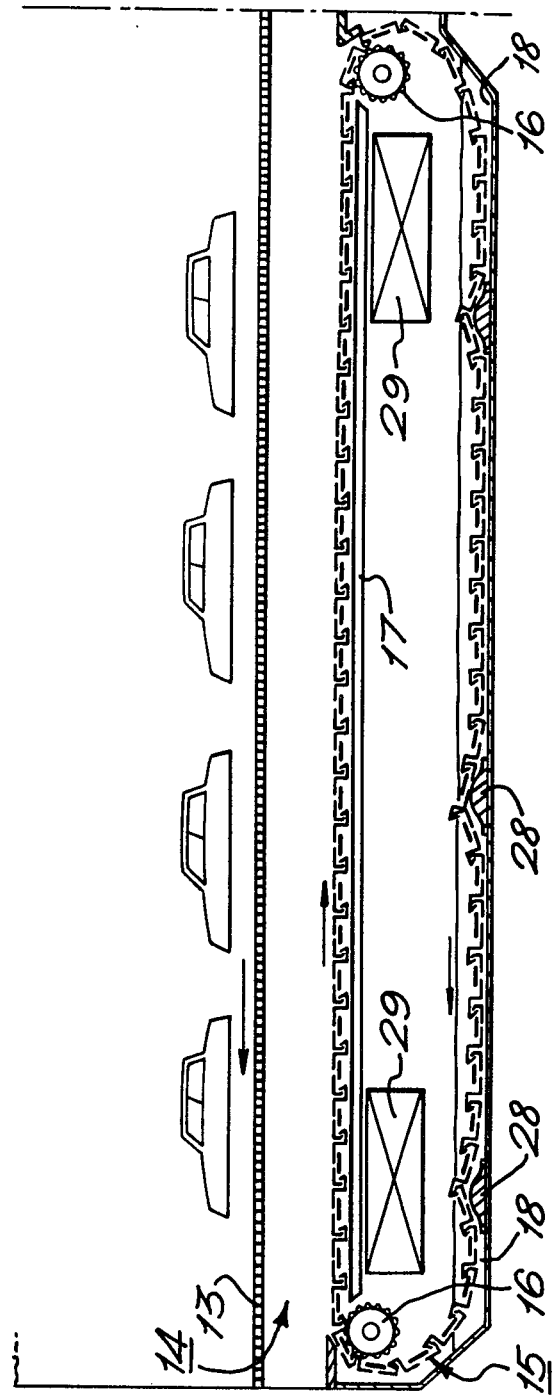
FIG. 2 shows a side view of the system for removing paint from paint-laden air shown in FIG. 1.

As is shown most clearly in FIG. 2, the system for removing the paint from the paint-laden air comprises an endless paint receiving member 15 arranged in the enclosure 14 to be circumgyrated by way of two drive sprockets 16. The upper run of the endless member 15 is supported by an angle 17. The sub-floor 18 of the enclosure 14 is shaped to define a trough in which the lower run of the endless member 15 is received.

The structure of the endless paint receiving member 15 can be seen more clearly in FIG. 3. The member 15 comprises a plurality of elongate channel members 19 each extending transversely to the longitudinal extent of the member 15. Each channel member 19 has two spaced parallel sidewalls 21 and 23 bridged by a substantially planar top surface 20. The sidewall 21 of each member 19, which forms the leading wall of each member 19 when the endless member 15 is circumgyrated, has an outwardly extending portion 24 projecting from its free end and an upstanding flange 25 projecting from the end of the portion 24. The trailing sidewall 23 of each channel member 19 has an inwardly inclined portion 22 which is arranged to be inserted between the sidewall 21 and the flange 25 of the adjacent, following channel member 19 and to engage against the flange 25. A plurality of inlet apertures, which as shown in FIG. 1, are in the form of slots 26 are provided along the length of the surface 20 of each channel member 19.

An air impact member in the form of an elongate plank 27 is mounted within each channel member 19 and extends along the length thereof, that is transversely of the endless member 15. In the embodiment illustrated each end of each plank 27 is supported by a respective end wall (not shown) attached to the ends of the respective channel member 19.

It will be appreciated from the above description that paint-laden air extracted through the floor 13 of the spray enclosure 10 flows through the inlet apertures 26 of the endless member 15. As can be clearly seen from FIG. 3, as the air travels through the apertures 26 it impinges on the upper surface of the planks 27 and is forced to change direction as indicated by the arrows. As the air flow changes direction it deposits the paint it is carrying onto the upper surface of the planks 27.

In use the endless member 15 is circumgyrated by means of the drive sprockets 16. In the embodiment illustrated the endless member is moved longitudinally with respect to the spraying enclosure 10. It will therefore be appreciated that the upper run of the endless member 15 on which the air flow impinges is continuously being replaced by further portions of the member 15. The paint carrying portions of the member 15 move around one of the drive sprockets 16 and into the sub-floor 18. The movement of the member 15 around a drive sprocket 16 articulates each channel member 19 relative to the adjacent channel member to ensure that adjacent channel members do not become stuck together by the paint.

The sub-floor 18 is divided into sections by way of transverse bars 28. Hence, different liquids can be inserted in the various sections thereof. Generally, the first sections of the sub-floor in the direction of movement of the endless member 15, would be filled with solvents and the following sections of the sub-floor would be filled with aqueous solutions to rinse off the solvents. The raised transverse bars 28 not only separate the various sections of the tank 18 but also serve to articulate the endless member 15 as it passes thereover to ensure that the liquids can freely enter the channel members.

The air flowing through the channel members 19 flows into the interior of the endless member 15. Exhaust openings 29 communicate with the interior of the endless member 15 to receive the air therefrom. Exhaust fans are provided to remove the extracted air through these exhaust openings 29. The air in the exhaust openings 29 can be fed back into the spraying enclosure if required after suitable treatment to remove solvent vapour. It will be appreciated that the treatment of the air is simplified because it is not laden with water vapour.

It will be seen from FIG. 1 that the endless member 15 is comprised of three sections. These sections can be moved together as a single member or moved independently of one another. In the embodiment illustrated in FIG. 1, as most of the waste paint exits through the central area of the floor, the two outer sections are simply plain channel members without the inlet apertures. The minimal amounts of paint deposited on these outer sections can easily be removed in the tank 18.

The embodiment illustrated has been described above with particular reference to the spraying of wet paint which will adhere to the upper surface of the planks 27. When the paint being sprayed is in powder form, that is, is dry paint, it is necessary to ensure that the powder adheres to the upper surface of the planks 27. If required, a suitable oil spray generator (not shown) may be provided to load the atmosphere local to the floor 13 of the spraying enclosure 10 with an inert dispersion of relatively large oil droplets. The dispersion will be drawn into the inlet apertures 26 to deposit on the upper surface of the planks 27, thus providing an adhesive film to retain the dry powder particles as they are subsequently deposited from the spraying enclosure. The oil is chosen to meet this function, and, at the same time, serve as a release agent to render removal of the powder easier in the tank 18. Alternatively, a resin based liquid may be used to provide the adhesive film on the upper surface of the planks 27.

In the embodiment illustrated the endless member 15 moves longitudinally of the spraying enclosure. Thus, if required, the endless member 15 could be utilised to move the articles through the spraying enclosure. In some applications, the floor 13 could then be dispensed with.

If required, the endless member can be arranged to move transversely of the paint spraying booth. This may well be of advantage where the longitudinal extent of the booth is considerable.

It will be appreciated that the speed of circumgyration of the endless member 15 can be chosen so that the length of time the lower run thereof spends in the tank 18 ensures that the paint is efficiently removed therefrom.

In the embodiment illustrated the air inlet apertures 26 are in the form of rectangular slots. Of course, other shaped apertures could be provided.

FIG. 4 shows a further embodiment of the endless member 15. In this embodiment the free end of each sidewall 21, 23 of the channel member 19 is curved and receives the curved end of the sidewall of the adjacent channel member. The curved ends can be engaged by conventional sprocket wheels to drive and guide the endless member.

In the embodiments described above, each elongate plank 27 is associated with a plurality of air inlet apertures. However, if required, a separate impact element can be associated with each aperture. In this case, the impact elements may comprise individual plates individually supported relative to the respective aperture at a suitable setting with respect thereto.

I claim:

1. A paint receiving member for removing paint from paint-laden air, said paint receiving member comprising a plurality of channel members, each channel member having two spaced sidewalls which extend substantially parallel to one another and a substantially planar surface bridging said sidewalls, the channel members being arranged in series with adjacent sidewalls linked together, each said planar surface having one or more air inlet apertures provided therein, and a plurality of elongate planks, each plank being supported within a respective one of the channel members to extend substantially parallel to the sidewalls thereof, wherein each elongate plank is arranged with respect to the inlet apertures of the respective channel member such that air flow through said apertures impinges on said plank and is diverted thereby, whereby paint carried by the air is deposited on said plank.

2. A paint receiving member according to claim 1, wherein said paint receiving member is endless.

3. A system for removing paint from the paint-laden air extracted from a paint spray booth, the system including:

a paint receiving device which comprises
a plurality of channel members, each channel member including two spaced sidewalls which extend substantially parallel to one another and a substantially planar surface bridging said sidewalls, the channel members being arranged in series with adjacent sidewalls linked together to form an endless loop, each of said planar surfaces having at least one air inlet aperture provided therein, and
a plurality of elongate planks, each plank being supported within a respective one of the channel members and extending substantially parallel to the sidewalls thereof, wherein each elongate plank is disposed in the path of the air flow through the aperture in said channel member wherein the air flow through said aperture impinges upon said plank and is diverted thereby, whereby paint carried by the air is deposited on said plank;
means for removing paint deposits from said paint receiving device; and
means for moving said paint receiving device through a first zone, in which paint-laden air impinges on at least a portion thereof, and subsequently through said paint removing means.

4. The system according to claim 3, wherein said paint removing means comprises a tank for containing solvents, said tank being disposed below a lower run of the endless paint receiving device to receive a portion of said paint receiving device for immersion therein, and wherein an upper run of the endless paint receiving device is positioned to be impinged upon by the air flow.

5. A system for removing paint from the paint-laden air extracted from a paint spray booth, the system including a paint receiving device arranged such that paint-laden air impinges on at least a portion thereof, a paint removing zone, and means for moving said paint receiving device through said paint removing zone, wherein said paint receiving device comprises a plurality of members interengaged with one another to define a substantially continuous surface having a plurality of openings therein, and a plurality of plates supported by said members, each plate being arranged to be impinged on by the air flow through at least one of said openings for diverting the air flow such that paint carried by the air is deposited on said plate.

6. A system according to claim 5, wherein said paint receiving device is endless and is moveable such that the portion on which the paint-laden air impinges is subsequently moved through said paint removing zone.

7. A paint spray booth comprising a spraying enclosure defined by walls, a roof structure, and a generally horizontal floor having a plurality of openings defined therein, means for extracting paint-laden air from the spraying enclosure through said openings in the floor, and a system for removing paint from the paint-laden air, said system being mounted beneath the floor and including a paint receiving device arranged such that paint-laden air impinges on at least a portion thereof, a paint removing zone, and means for moving said paint receiving device through said paint removing zone, said paint receiving device comprises a plurality of members interengaged with one another to define a substantially continuous surface having a plurality of openings therein, and a plurality of plates supported by said members, each plate being arranged to be impinged on by the air flow through at least one of said openings for diverting the air flow such that paint carried by the air is deposited on said plate.

8. A paint spray booth including a spraying enclosure comprising:

a plurality of upwardly extending walls;
a roof structure interconnecting the top of said walls;
a sub-floor interconnecting the bottom of said walls;
an air filtration system mounted so as to be located on the subfloor and including an endless paint receiving device which has a horizontal upper run defining a floor of said booth and being arranged such that paint-laden air impinges on a portion thereof;
means for extracting paint-laden air from the spraying enclosure through said air filtration system;
means for removing paint from said paint receiving device located adjacent to said paint receiving device; and
means for moving said paint receiving device through said paint removing means, said paint receiving device further including:
(a) a plurality of members interengaged with one another to define a substantially continuous surface which has a plurality of openings therein,
(b) a plate supported by each of said members, and said plate being arranged to be impinged upon by the air flow through at least one of said openings for diverting the air flow such that the paint suspended in the air is deposited on said plate.

9. A paint receiving device for removing paint from paint-laden air, said paint receiving device comprising a plurality of members interengaged with one another to define an endless and substantially continuous surface having a plurality of openings therein, and a plurality of plates supported by said members, each plate being arranged to be impinged on by the air flow through at least one of said openings for diverting the air flow such that paint carried by air is deposited on said plate.

* * * * *